US008133015B2

(12) United States Patent
Briggs et al.

(10) Patent No.: US 8,133,015 B2

(45) Date of Patent: Mar. 13, 2012

(54) TURBINE NOZZLE FOR A GAS TURBINE ENGINE

(75) Inventors: Robert David Briggs, West Chester, OH (US); Shawn Michael Pearson, Sharonville, OH (US); Jack Willard Smith, Jr., Loveland, OH (US); Dennis Centeno Iglesias, Cambridge, MA (US)

(73) Assignee: General Electric Company, Schenectady, NY (US)

( * ) Notice: Subject to any disclaimer, the term of this patent is extended or adjusted under 35 U.S.C. 154(b) by 834 days.

(21) Appl. No.: 12/241,878

(22) Filed: Sep. 30, 2008

(65) Prior Publication Data

US 2010/0080695 A1 Apr. 1, 2010

(51) Int. Cl.

| | |
|---|---|
| ***F01D 1/02*** | (2006.01) |
| ***F01D 9/00*** | (2006.01) |
| ***F03B 1/04*** | (2006.01) |
| ***F03B 3/16*** | (2006.01) |
| ***F03D 1/04*** | (2006.01) |
| ***F03D 11/00*** | (2006.01) |
| ***F03D 3/04*** | (2006.01) |
| ***F04D 29/44*** | (2006.01) |
| ***F04D 29/54*** | (2006.01) |

(52) U.S. Cl. ........................................................ 415/191

(58) Field of Classification Search .................. 415/191

See application file for complete search history.

(56) References Cited

U.S. PATENT DOCUMENTS

| | | | | |
|---|---|---|---|---|
| 4,187,054 | A | 2/1980 | Landis et al. | |
| 6,382,908 | B1 | 5/2002 | Keith et al. | |
| 7,121,793 | B2 | 10/2006 | Correia | |
| 7,140,835 | B2 | 11/2006 | Lee et al. | |
| 7,578,653 | B2 | 8/2009 | Klasing et al. | |
| 2006/0133929 | A1 * | 6/2006 | Miller et al. | 415/191 |

* cited by examiner

*Primary Examiner* — David S Blum

(74) *Attorney, Agent, or Firm* — David J. Clement; Trego, Hines & Ladenheim, PLLC

(57) ABSTRACT

A turbine nozzle includes: a hollow, airfoil-shaped turbine vane; and an arcuate first band disposed at a first end of the turbine vane, the first band having a flowpath face adjacent the turbine vane, and an opposed back face. The back face includes at least one open pocket, the at least one pocket defined in part by a bottom wall recessed from the back face, opposed ends of the bottom wall merging with the back face. The bottom wall is substantially free of interior corners.

17 Claims, 8 Drawing Sheets

TURBINE NOZZLE FOR A GAS TURBINE ENGINE

BACKGROUND OF THE INVENTION

This invention relates generally to gas turbine engines and more particularly to apparatus for cooling turbine nozzles in such engines.

A gas turbine engine includes a turbomachinery core having a high pressure compressor, combustor, and high pressure turbine ("HPT") in serial flow relationship. The core is operable in a known manner to generate a primary gas flow. The high pressure turbine includes annular arrays ("rows") of stationary vanes or nozzles that direct the gases exiting the combustor into rotating blades or buckets. Collectively one row of nozzles and one row of blades make up a "stage". Typically two or more stages are used in serial flow relationship. These components operate in an extremely high temperature environment, and must be cooled by air flow to ensure adequate service life.

HPT nozzles are often configured as an array of airfoil-shaped vanes extending between annular inner and outer bands which define the primary flowpath through the nozzle. Some prior art HPT nozzles have experienced temperatures on the aft inner band above the design intent. This has lead to the loss of the aft inner band because of oxidation at a low number of engine cycles. The material loss can trigger a chain of undesirable events, leading to serious engine failures. For example, in a multi-stage HPT, the loss of the aft portion of the first stage nozzle inner band can cause hot gas ingestion between the first stage nozzle and the forward rotating seal member or "angel wing" of the adjacent first stage blade. The ingested primary flow can in turn heat up the forward cooling plate of the first stage rotor disk causing it to crack. Once the cooling plate is cracked, hot air can heat up the first stage rotor disk causing damage to the disk post, which could lead to the release of a first stage turbine blade.

The inner bands of prior art HPT nozzles often have a pocket of material removed therefrom, for the purposes of weight reduction. However, in the presence of high velocity flow, as seen under a typical inner band, this pocket can cause a stagnation region. The stagnation region degrades cooling and can lead to the failures described above.

BRIEF SUMMARY OF THE INVENTION

These and other shortcomings of the prior art are addressed by the present invention, which provides an inner band with a weight reduction pocket that discourages stagnation of high velocity flow.

According to one aspect of the invention, A turbine nozzle includes: a hollow, airfoil-shaped turbine vane; and an arcuate first band disposed at a first end of the turbine vane, the first band having a flowpath face adjacent the turbine vane, and an opposed back face. The back face includes at least one open pocket, the at least one pocket defined in part by a bottom wall recessed from the back face, opposed ends of the bottom wall merging with the back face. The bottom wall is substantially free of interior corners.

According to another aspect of the invention, A turbine assembly for a gas turbine engine includes: a turbine rotor comprising a disk carrying a plurality of airfoil-shaped turbine blades extending across a primary flowpath; and a turbine nozzle disposed upstream of the rotor. The turbine nozzle includes: a plurality of hollow, airfoil-shaped turbine vanes extending across the primary flowpath; an arcuate inner band disposed at an inner end of the turbine vane. The inner band has a flowpath face facing radially outward, and an opposed back face. The back face includes at least one open pocket, the at least one pocket defined in part by a bottom wall recessed from the back face, opposed ends of the bottom wall merging with the back face. The bottom wall is substantially free of interior corners.

BRIEF DESCRIPTION OF THE DRAWINGS

The invention may be best understood by reference to the following description taken in conjunction with the accompanying drawing figures in which.

DETAILED DESCRIPTION OF THE INVENTION

Figure 1:
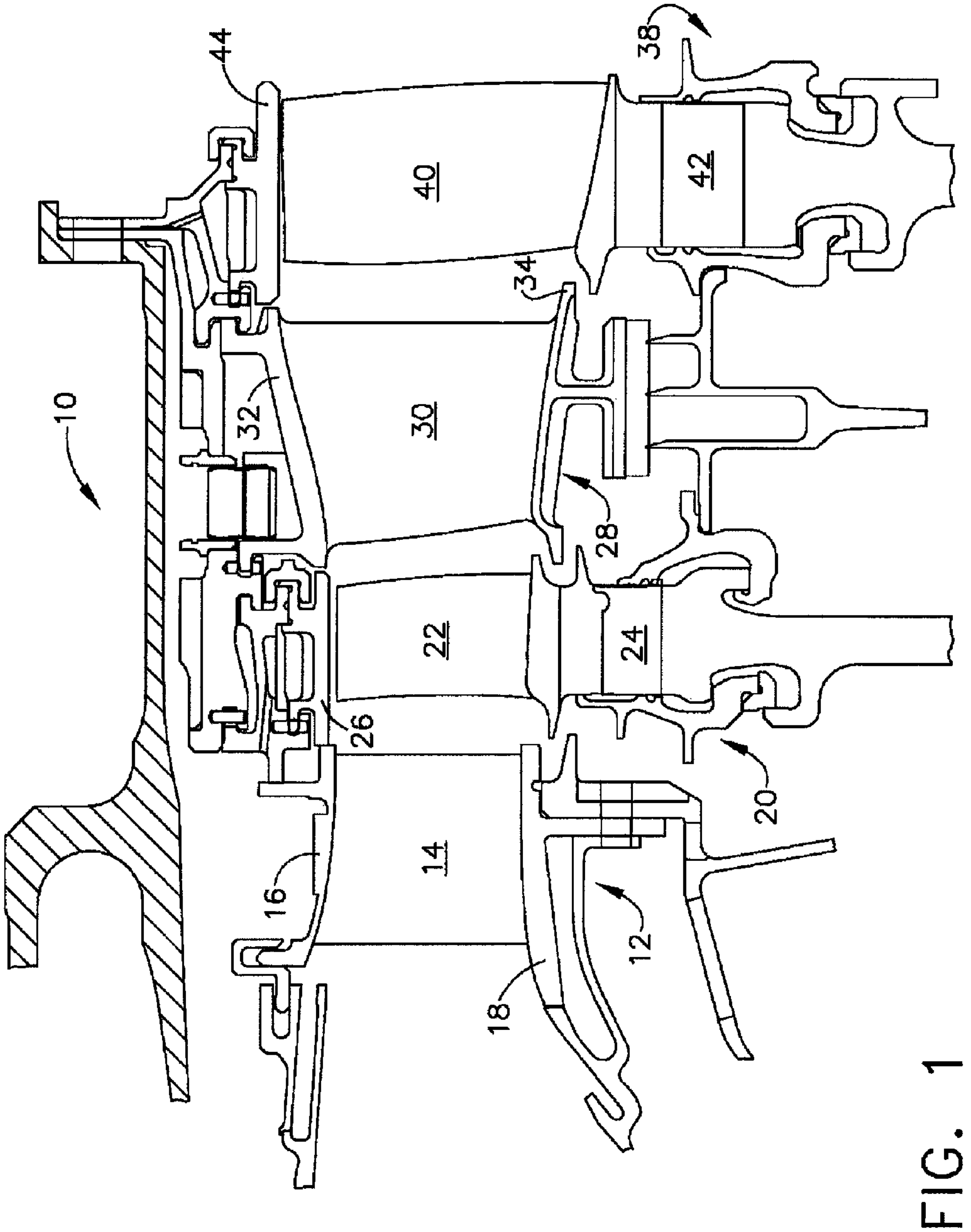
FIG. 1 is a cross-sectional view of a high pressure turbine section of a gas turbine engine, constructed in accordance with an aspect of the present invention.

Referring to the drawings wherein identical reference numerals denote the same elements throughout the various views, FIG. 1 depicts a portion of a high pressure turbine 10, which is part of a gas turbine engine of a known type. The function of the high pressure turbine 10 is to extract energy from high-temperature, pressurized combustion gases from an upstream combustor (not shown) and to convert the energy to mechanical work, in a known manner. The high pressure turbine 10 drives an upstream compressor (not shown) through a shaft so as to supply pressurized air to a combustor.

In the illustrated example, the engine is a turbofan engine and a low pressure turbine (not shown) would be located downstream of the gas generator turbine 10 and coupled to a shaft driving a fan. However, the principles described herein are equally applicable to turboprop and turbojet engines, as well as turbine engines used for other vehicles or in stationary applications.

The high pressure turbine 10 includes a first stage nozzle 12 which comprises a plurality of circumferentially spaced airfoil-shaped hollow first stage vanes 14 that are supported between an arcuate, segmented first stage outer band 16 and an arcuate, segmented first stage inner band 18. The first stage vanes 14, first stage outer band 16 and first stage inner band 18 are arranged into a plurality of circumferentially adjoining nozzle segments that collectively form a complete 360° assembly. The first stage outer and inner bands 16 and 18 define the outer and inner radial flowpath boundaries, respectively, for the hot gas stream flowing through the first stage nozzle 12. The first stage vanes 14 are configured so as to optimally direct the combustion gases to a first stage rotor 20.

The first stage rotor 20 includes a array of airfoil-shaped first stage turbine blades 22 extending outwardly from a first stage disk 24 that rotates about the centerline axis of the engine. A segmented, arcuate first stage shroud 26 is arranged so as to closely surround the first stage turbine blades 22 and thereby define the outer radial flowpath boundary for the hot gas stream flowing through the first stage rotor 20.

A second stage nozzle 28 is positioned downstream of the first stage rotor 20, and comprises a plurality of circumferentially spaced airfoil-shaped hollow second stage vanes 30 that are supported between an arcuate, segmented second stage outer band 32 and an arcuate, segmented second stage inner band 34. The second stage vanes 30, second stage outer band 32 and second stage inner band 34 are arranged into a plurality of circumferentially adjoining nozzle segments that collectively form a complete 360° assembly. The second stage outer and inner bands 32 and 34 define the outer and inner radial flowpath boundaries, respectively, for the hot gas stream flowing through the second stage turbine nozzle 34. The second stage vanes 30 are configured so as to optimally direct the combustion gases to a second stage rotor 38.

The second stage rotor 38 includes a radial array of airfoil-shaped second stage turbine blades 40 extending radially outwardly from a second stage disk 42 that rotates about the centerline axis of the engine. A segmented arcuate second stage shroud 44 is arranged so as to closely surround the second stage turbine blades 40 and thereby define the outer radial flowpath boundary for the hot gas stream flowing through the second stage rotor 38.

Figure 2:
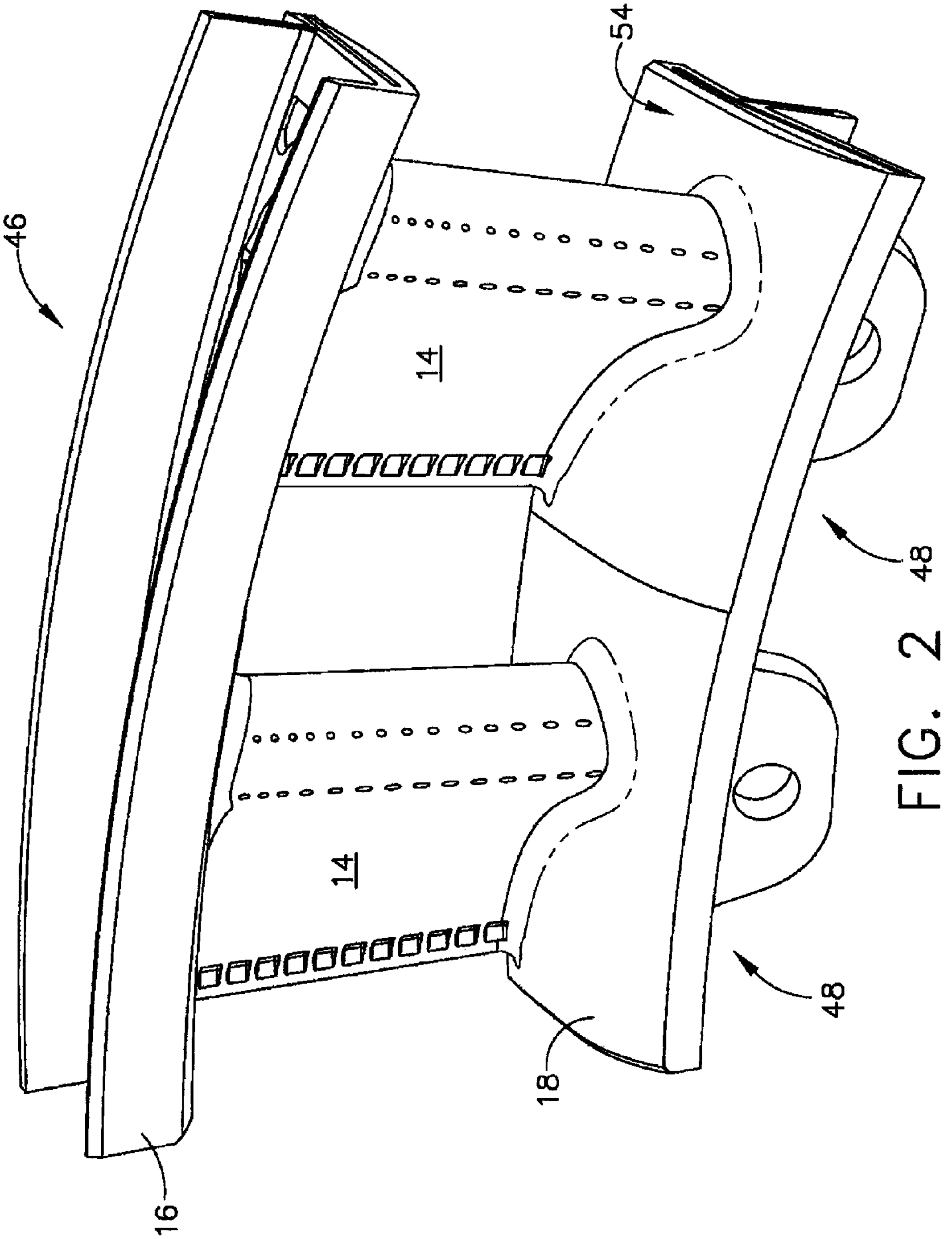
FIG. 2 is a perspective view of a turbine nozzle segment.
Figure 3:
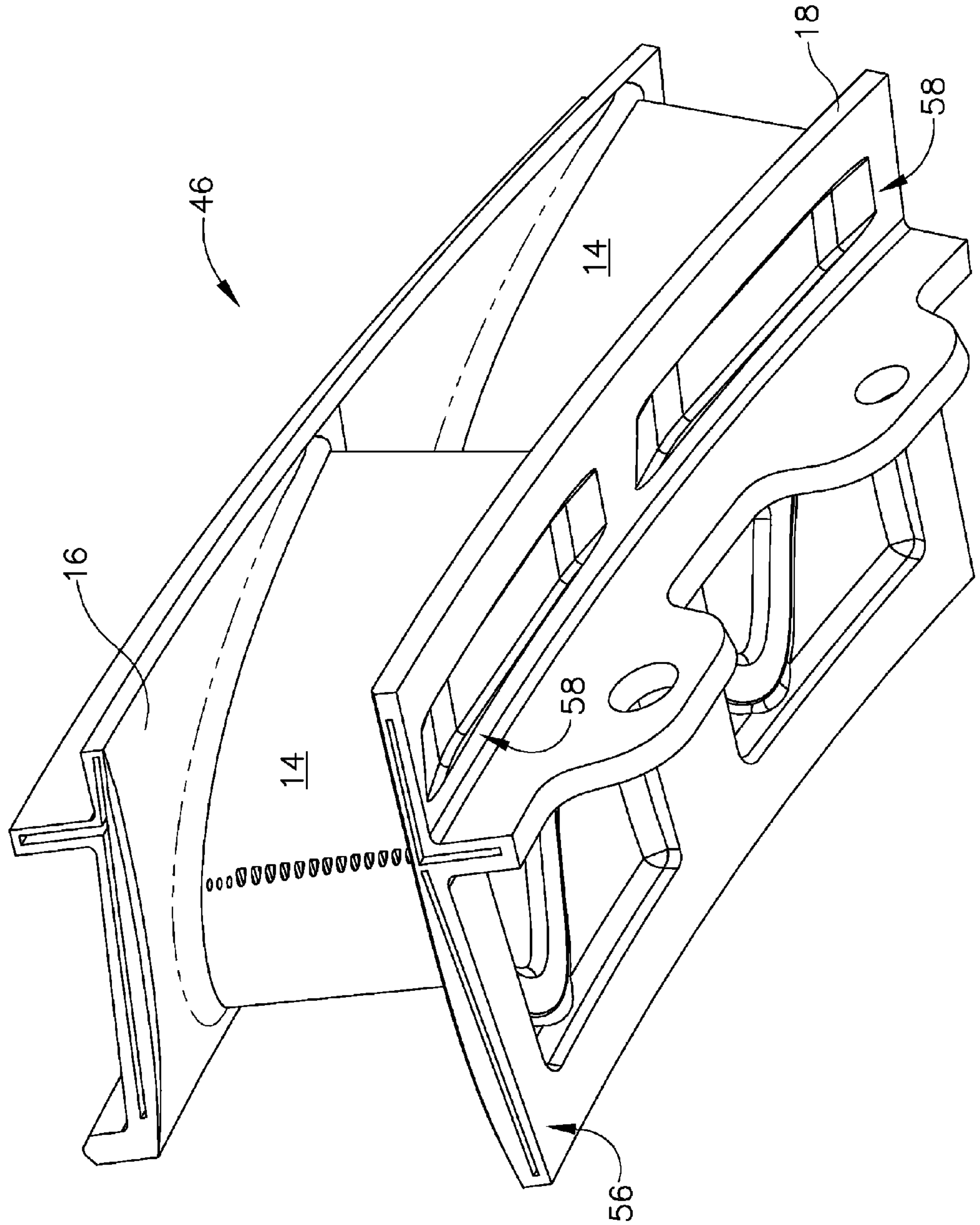
FIG. 3 is another perspective view of a turbine nozzle segment.

FIGS. 2 and 3 illustrate one of the several nozzle segments 46 that make up the first stage nozzle 12. The nozzle segment 46 comprises two individual "singlet" castings 48 which are arranged side-by side and bonded together, for example by brazing, to form a unitary component. Each singlet 48 is cast from a known material having suitable high-temperature properties such as a nickel- or cobalt-based "superalloy" and includes a segment of the outer band 16, a segment of the inner band 18, and a hollow first stage vane 14. The concepts described herein are equally applicable to turbine nozzles made from "doublet" castings as well as multiple-vane castings and continuous turbine nozzle rings.

The inner band 18 has a flowpath face 54 and an opposed back face 56. One or more open pockets 58 are formed in the back face 56. The pockets 58 may be formed by incorporating them into the casting, by machining, or by a combination of techniques.

Figure 4:
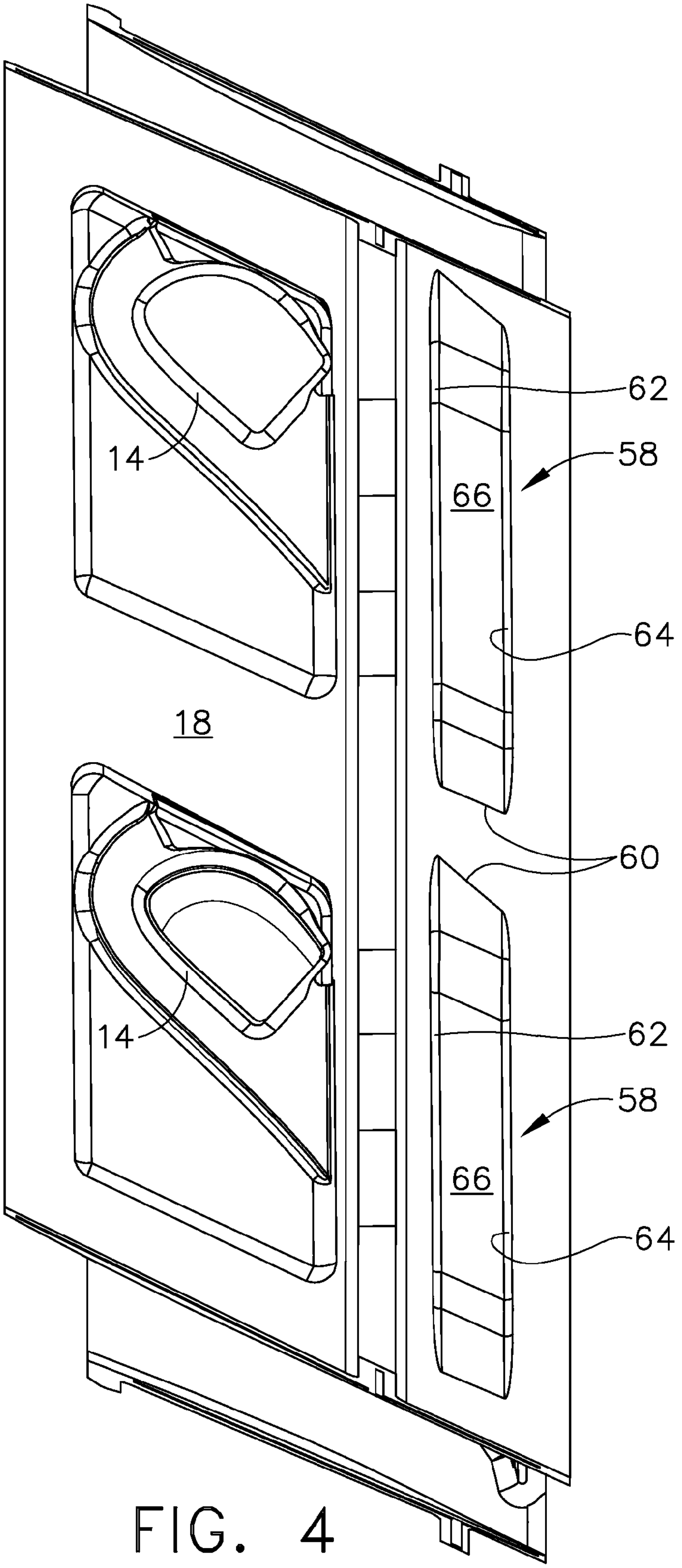
FIG. 4 is bottom view of the turbine nozzle segment of FIG. 2.
Figure 5:
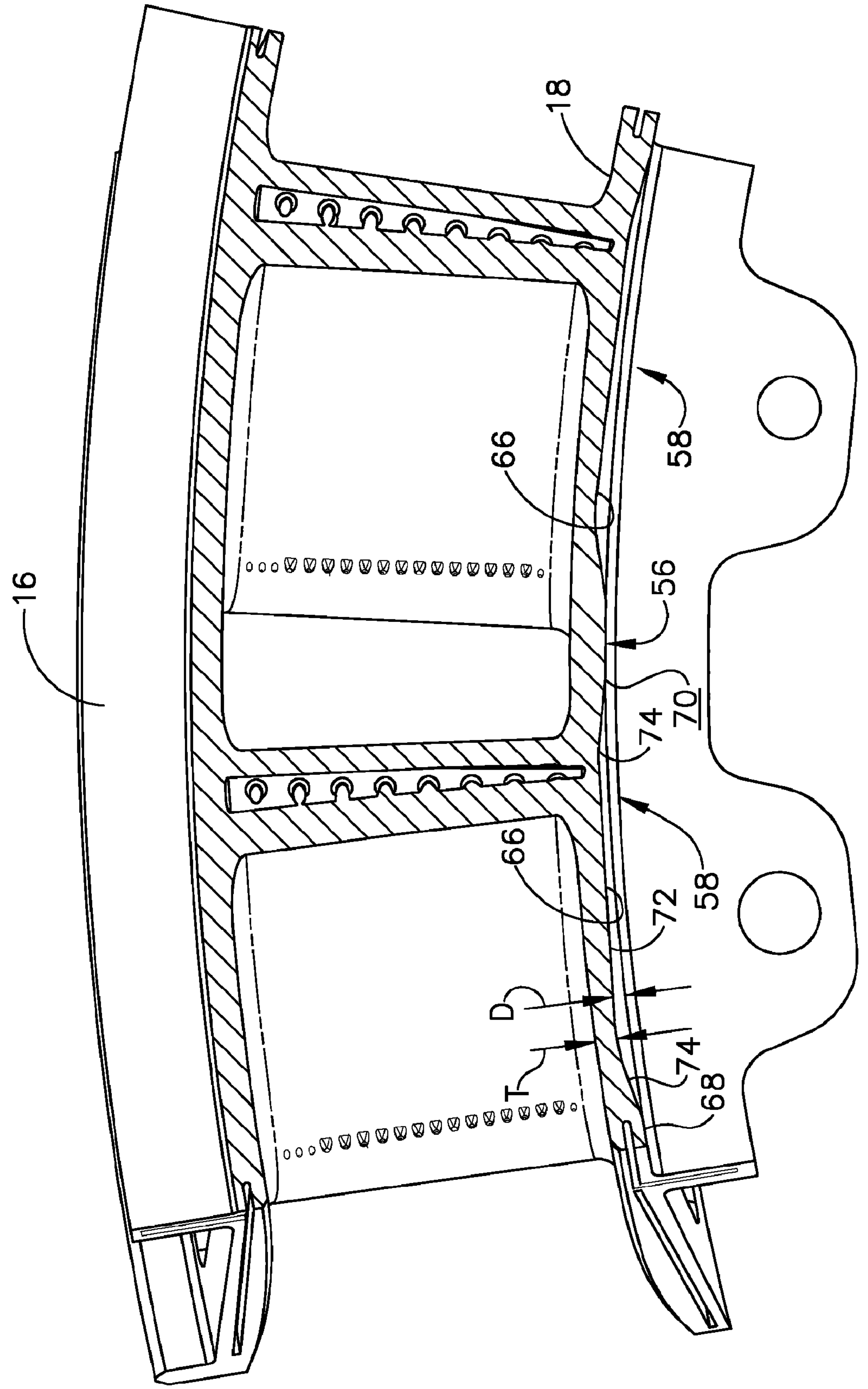
FIG. 5 is a transverse sectional view of the turbine nozzle segment of FIG. 2.
Figure 6:
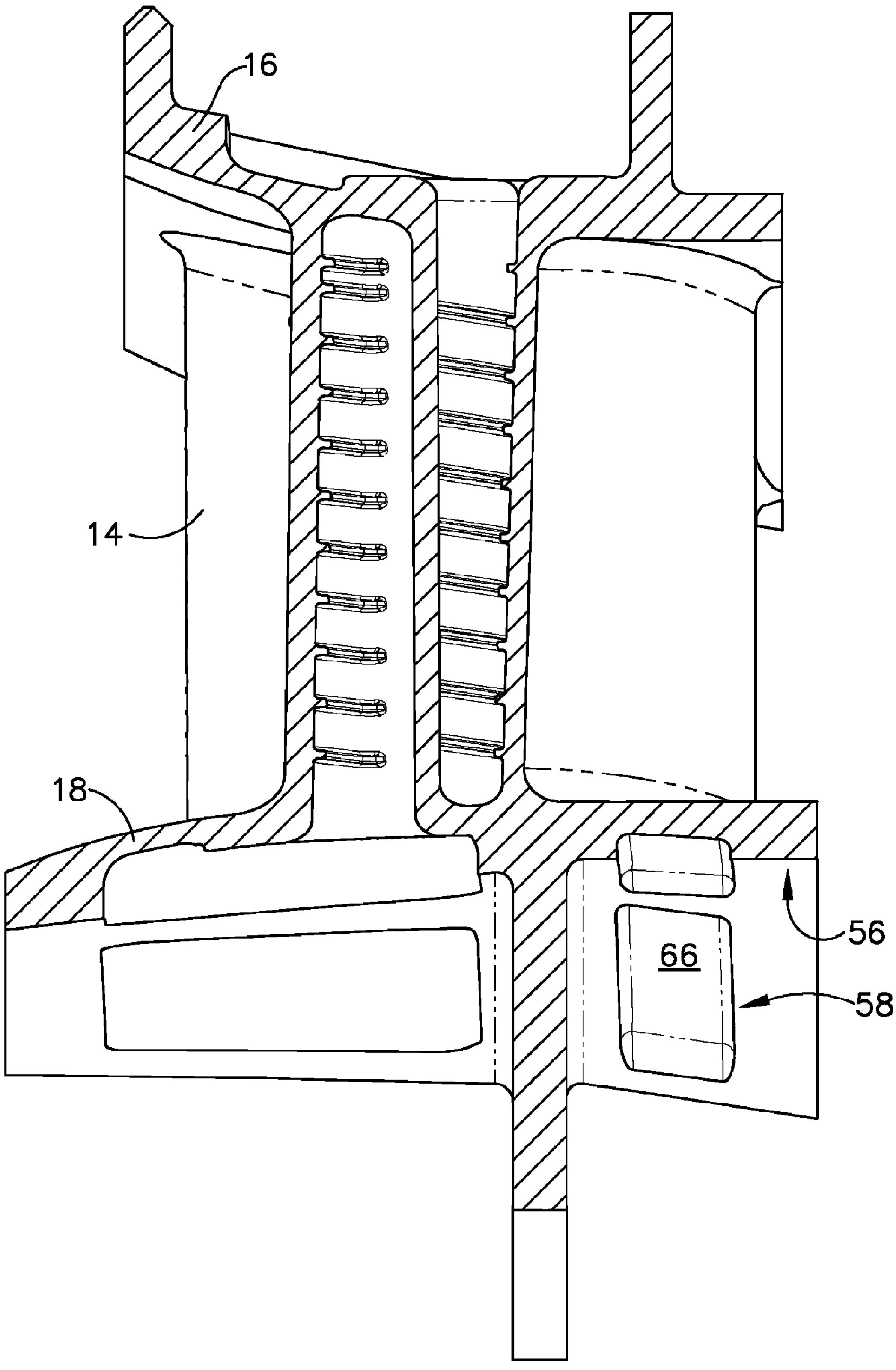
FIG. 6 is a cross-sectional view of the turbine nozzle of FIG. 2.

FIGS. 4-6 illustrate the pockets 58 in more detail. Each pocket 58 has an open peripheral edge 60. Its shape is bounded and collectively defined by a forward wall 62, an aft wall 64, and a bottom wall 66. The forward and aft walls 62 and 64 are generally planar, parallel to each other, and aligned in a radial direction. Their shape is not critical to the operation of the present invention.

The bottom wall 66 extends in a generally circumferential direction between first and second ends 68 and 70. The bottom wall 66 includes a central portion 72 which is recessed from the back face 56 and two end portions 74. The end portions 74 form ramps between the central portion 72 and the back face 56. The central portion 72 may define a portion of a circular arc, or another suitable curved profile.

The distance that the bottom wall 66 is offset from the back face 56 in a radial direction is referred to as the "depth" of the pocket 58 and is denoted "D". The specific value of "D" varies at each location of the pocket 58, generally being the greatest near the circumferential midpoint of the pocket 58 and tapering to zero at the ends 68 and 70. It is desirable for weight reduction purposes to make the depth "D" as large as possible. The maximum depth achievable is limited by the minimum acceptable material thickness in the inner band 18 and the vane 14, shown at "T" in several locations (see FIG. 5). As an example a minimum thickness may be about 1.0 mm (0.040 in.).

Figure 7:
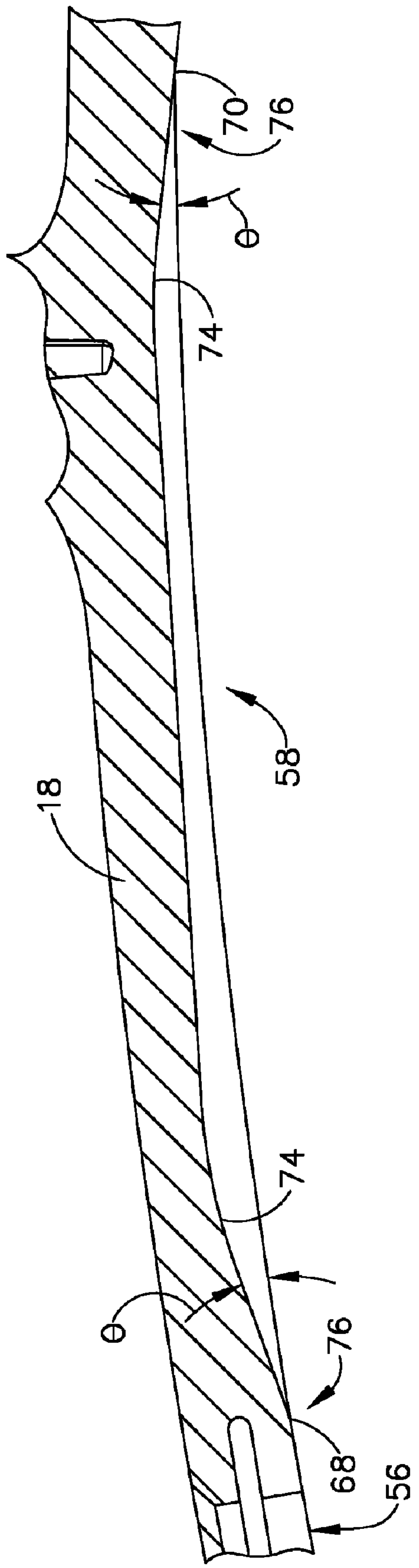
FIG. 7 is a transverse sectional view of a portion of the inner band of the turbine nozzle segment of FIG. 2.

FIG. 7 illustrates the profile of the pocket 58 in transverse section. Each of the end portions 74 is disposed at a non-perpendicular, non-parallel angle θ to the back face 56 of the inner band 18. The angle θ will vary to suit a particular application, however analysis suggests that a ramp angle θ of about 20° or less will minimize or eliminate recirculation. In any case, the bottom wall 66 is substantially free of any sharp transitions or small-radius curves that would constitute interior corners. A smooth transition may be provided at the intersection of the end portions 74 and the back face 56. For example, a lead-in section 76 disposed at an angle of about 2° to about 3° to the back face 56, and smoothly radiused into the end portion 74, or a simple convex radiused shape, may be used.

Figure 8:
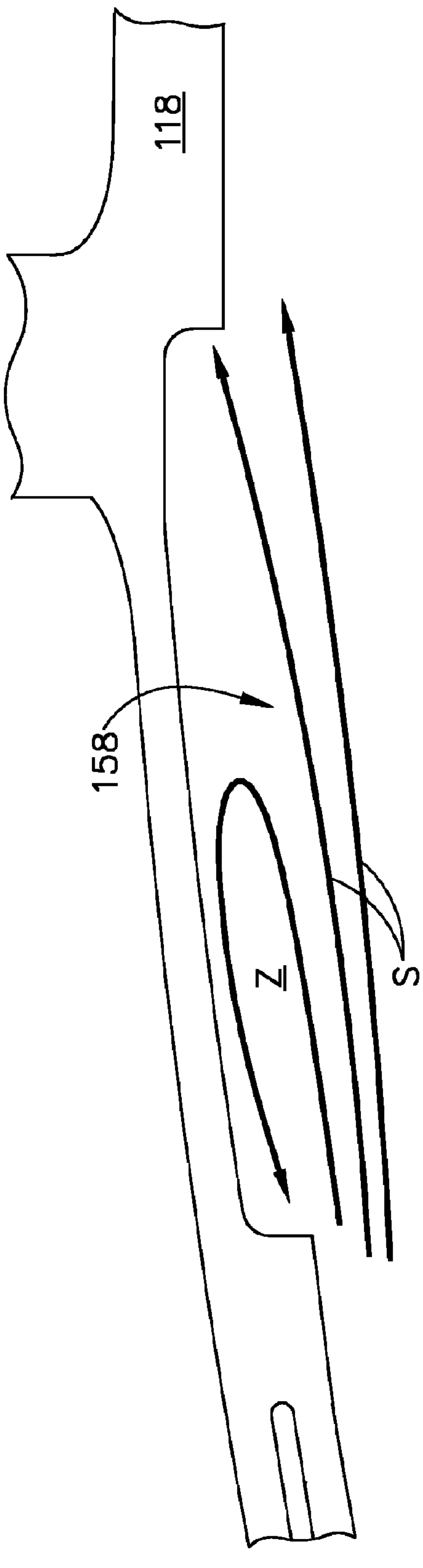
FIG. 8 is a schematic transverse sectional view of a portion of an inner band of a prior art turbine nozzle segment.

In operation, a substantial purge flow of relatively cool air occurs in the secondary air flow path in contact with the back face 56 of the inner band 18. The location of this flow is shown with an "X" in FIG. 1. Its velocity is primarily tangential (i.e. into or out of the page in FIG. 1). The streamlines "S" in FIG. 8 show the effect of this flow on a prior art inner band 118 a pocket 158 having a conventional shape. There is clearly a zone "Z" within which the air recirculates at a relatively low velocity, impeding heat transfer from the inner band 118 to the purge flow. Furthermore, this zone Z can accumulate foreign matter such as dust which forms an insulating layer on the inner band 118, further degrading heat transfer.

Figure 9:
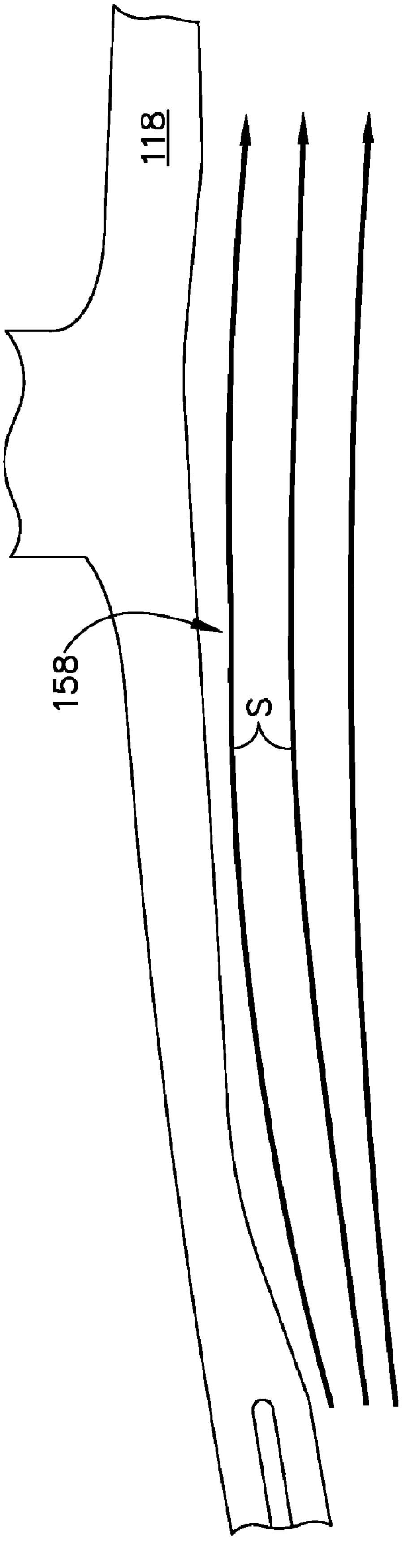
FIG. 9 is a schematic transverse sectional view of a portion of the inner band of the turbine nozzle segment of FIG. 2.

In contrast, FIG. 9 illustrates the flow past the pocket 58 of the inner band 58 described above. The purge flow passes by the pocket 58 at high velocity with little or no recirculation. The pocket shape described above, when compared to a prior art pocket configuration, is expected to dramatically improve heat transfer to the high speed, cooler flow under the inner band 18 by eliminating the recirculation zone, resulting in generally higher flow velocities in contact with the metal; by reducing windage losses, increasing the average flow velocity over the surface; and by substantial decrease in dust accumulation that can form an adverse insulating layer. Preliminary heat transfer analysis of an exemplary component has predicted a local metal temperature reduction of about 33° C. (60° F.) or more, as compared to the prior art pocket geometry.

The foregoing has described a pocket geometry for a turbine nozzle band. While specific embodiments of the present invention have been described, it will be apparent to those skilled in the art that various modifications thereto can be made without departing from the spirit and scope of the invention. Accordingly, the foregoing description of the preferred embodiment of the invention and the best mode for practicing the invention are provided for the purpose of illustration only and not for the purpose of limitation.

What is claimed is:

1. A turbine nozzle comprising:

(a) a hollow, airfoil-shaped turbine vane;

(b) an arcuate first band disposed at a first end of the turbine vane, the first band having a flowpath face adjacent the turbine vane, and an opposed back face;

(c) wherein the back face includes at least one open pocket, the at least one pocket defined in part by a bottom wall recessed from the back face, opposed ends of the bottom wall merging with the back face; and (d) wherein the bottom wall is substantially free of interior corners.

2. The turbine nozzle of claim 1 wherein the bottom wall comprises a central portion disposed between end portions, each of the end portions forming a ramp between the back face and the central portion of the bottom wall.

3. The turbine nozzle of claim 2 wherein each of the end portions forms an angle of about 20 degrees or less with the back face.

4. The turbine nozzle of claim 1 wherein an angled transition region is disposed at each of the opposed ends of the bottom wall where it intersects the back face.

5. The turbine nozzle of claim 1 wherein a radiused transition region is disposed at each of the opposed ends of the bottom wall where it intersects the back face.

6. The turbine nozzle of claim 1 wherein the bottom wall is bounded by opposed forward and aft walls extending between the bottom wall and the back face.

7. The turbine nozzle of claim 6 wherein the forward and aft walls are generally planar and parallel to each other.

8. The turbine nozzle of claim 1 further comprising an arcuate second band disposed at an opposite end of the turbine vane from the first band.

9. The turbine nozzle of claim 1 wherein a plurality of hollow, airfoil-shaped turbine vanes are disposed between the first and second bands.

10. A turbine assembly for a gas turbine engine, comprising:

(a) a turbine rotor comprising a disk carrying a plurality of airfoil-shaped turbine blades extending across a primary flowpath; and (b) a turbine nozzle disposed upstream of the rotor, comprising:

(i) a plurality of hollow, airfoil-shaped turbine vanes extending across the primary flowpath;

(ii) an arcuate inner band disposed at an inner end of the turbine vane, the inner band having a flowpath face facing radially outward, and an opposed back face;

(iii) wherein the back face includes at least one open pocket, the at least one pocket defined in part by a bottom wall recessed from the back face, opposed ends of the bottom wall merging with the back face; and (iv) wherein the bottom wall is substantially free of interior corners.

11. The turbine assembly of claim 10 wherein the bottom wall comprises a central portion disposed between end portions, each of the end portions forming a ramp between the back face and the central portion of the bottom wall.

12. The turbine assembly of claim 11 wherein each of the end portions forms an angle of about 20 degrees or less with the back face.

13. The turbine assembly of claim 10 wherein an angled transition region is disposed at each of the opposed ends of the bottom wall where it intersects the back face.

14. The turbine assembly of claim 10 wherein a radiused transition region is disposed at each of the opposed ends of the bottom wall where it intersects the back face.

15. The turbine assembly of claim 10 wherein the bottom wall is bounded by opposed forward and aft walls extending between the bottom wall and the back face.

16. The turbine assembly of claim 15 wherein the forward and aft walls are generally planar and parallel to each other.

17. The turbine assembly of claim 10 further comprising an arcuate outer band disposed at an opposite end of the turbine vane from the inner band.

* * * * *